3,168,544
PREPARATION OF CYANOALKYLSILANES
Victor B. Jex, Clarence, N.Y., assignor to Union Carbide Corporation, a corporation of New York
No Drawing. Filed Aug. 23, 1961, Ser. No. 133,317
3 Claims. (Cl. 260—448.2)

This invention relates to novel organosilicon compounds and, in particular, to novel cyanoalkylsilicon compounds.

The cyanoalkylsilicon compounds of this invention include both cyanoalkylsilanes which contain a cyano group linked to silicon through at least two successive carbon atoms of an alkylene group and cyanoalkylsiloxanes which contain a cyano group linked to silicon through at least two successive carbon atoms of an alkylene group.

The cyanoalkylsilanes of this invention are represented by the formula:

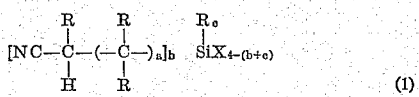

(1)

wherein R is a monovalent hydrocarbon group or a hydrogen atom, X is a hydrocarbonoxy group or a halogen atom, $a$ has a value of at least one, $b$ has a value from 1 to 3 inclusive, $c$ has a value from 0 to 2 inclusive and $(b+c)$ has a value from 1 to 3 inclusive.

The cyanoalkylsiloxanes of this invention contain the group represented by the formula:

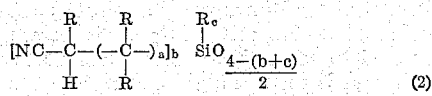

(2)

wherein R, $a$, $b$, $c$ and $(b+c)$ have the above-defined meanings.

The cyanoalkylsiloxanes of this invention include both siloxanes consisting essentially of groups represented by Formula 2 and also copolymeric siloxanes consisting essentially of from 0.1 to 99.9 mole-percent of groups represented by Formula 2 and from 0.1 to 99.9 mole-percent of groups represented by the formula:

(3)

wherein R has the above-defined meanings and $d$ has a value from 0 to 3 inclusive.

Illustrative of the cyanoalkylsilanes of this invention are
beta-cyanoethyltrichlorosilane,
beta-cyanoethyltriethoxysilane,
beta-cyanoethylmethyldichlorosilane,
beta-cyanoethylmethyldiethoxysilane,
beta-cyanoethylethyldichlorosilane,
beta-cyanoethylethyldipropoxysilane,
beta-cyanoethylhydrogendichlorosilane,
beta-cyanoethylhydrogendichlorosilane,
beta-cyanoethylhydrogendiethoxysilane,
beta-cyanoethylphenyldichlorosilane,
beta-cyanoethylphenyldipropoxysilane,
beta-cyanoethyldimethylchlorosilane,
beta-cyanoethyldiphenylchlorosilane,
beta-cyanoethylmethylhydrogenchlorosilane,
beta-cyanoethylphenylhydrogenchlorosilane,
beta-cyanoethyldiphenylethoxysilane,
beta-cyanoethylmethylhydrogenethoxysilane,
beta-cyanoethylphenylhydrogenethoxysilane,
bis(beta-cyanoethyl-diethoxysilane,
gamma-cyanopropylhydrogendiethoxysilane,
gamma-cyanopropylhydrogendichlorosilane,
bis(gamma-cyanopropyl)hydrogenchlorosilane,
bis(gamma-cyanopropyl)hydrogenethoxysilane,
delta-cyanobutylhydrogendichlorosilane,
epsilon-cyanopentylhydrogendiethoxysilane,
bis(beta-cyanoethyl)methylethoxysilane,
bis(beta-cyanoethyl)phenylchlorosilane,
bis(beta-cyanoethyl)hydrogenchlorosilane,
tris(beta-cyanoethyl)chlorosilane,
tris(beta-cyanoethyl)ethoxysilane,
gamma-cyanopropyltriethoxysilane,
gamma-cyanopropyltrichlorosilane,
gamma-cyanopropylmethyldiethoxysilane,
gamma-cyanopropylmethyldichlorosilane,
gamma-cyanopropylethyldiethoxysilane,
gamma-cyanopropylethyldichlorosilane,
gamma-cyanopropylphenyldiethoxysilane,
gamma-cyanopropylphenyldichlorosilane,
gamma-cyanobutyltriethoxysilane,
gamma-cyanobutylethyldiethoxysilane,
gamma-cyanobutyltrichlorosilane,
delta-cyanobutyltriethoxysilane,
delta-cyanobutyltrichlorosilane,
delta-cyanobutylethyldiethoxysilane,
delta-cyanobutylethyldichlorosilane,
delta-cyanobutylethylphenylethoxysilane,
gamma-cyanopentyltriethoxysilane,
delta-cyanopentyltriphenoxysilane,
delta-cyanopentylethyldiethoxysilane,
epsilon-cyanopentyltriethoxysilane,
epsilon-cyanopentyltrichlorosilane,
epsilon-cyanopentylethylchloroethoxysilane,
epsilon-cyanopentylethyldiethoxysilane,
epsilon-cyanopentyldiethylethoxysilane,
bis(gamma-cyanopropyl)dichlorosilane,
bis(gamma-cyanopropyl)diethoxysilane,
bis(gamma-cyanobutyl)diphenoxysilane,
tris(gamma-cyanobutyl)ethoxysilane,
bis(gamma-cyanobutyl)ethylethoxysilane,
bis(delta-cyanobutyl)diethoxysilane,
bis(delta-cyanobutyl)dichlorosilane and
tris(epsilon-cyanopentyl)ethoxysilane.

Illustrative of the groups represented by Formula 2 are the beta-cyanoethylsiloxy, gamma-cyanopropylsiloxy, delta-cyanobutylsiloxy, beta-cyanoethyldiphenylsiloxy, and epsilon-pentyl(methyl)siloxy groups.

Illustrative of the groups represented by Formula 3 are the $SiO_2$, methylsiloxy, dimethylsiloxy, trimethylsiloxy, phenylsiloxy, beta-phenylethylsiloxy, vinylsiloxy and ethyl(vinyl)siloxy groups.

Illustrative of the monovalent hydrocarbon groups represented by R in Formula 1 are the linear alkyl groups (for example the methyl, ethyl, propyl, butyl, and amyl groups), the cyclic alkyl groups (for example the cyclohexyl and cyclopentyl groups), the linear alkenyl groups (for example the vinyl and the allyl groups), the cyclic alkenyl groups (for example the cyclopentenyl and the cyclohexenyl groups), the aryl groups (for example the phenyl and naphthyl groups), the alkaryl groups (for example the tolyl group), and the aralkyl groups (for example the benzyl and beta-phenylethyl groups). Preferably R represents a group containing up to 10 carbon atoms.

Illustrative of the hydrocarbonoxy groups represented by X in Formula 1 are the alkoxy groups (e.g. the methoxy, ethoxy, propoxy and butoxy groups) and the aroxy groups (e.g. the phenoxy group).

Illustrative of the halogen atoms represented by X in Formula 1 are the chlorine and bromine atoms.

The cyanoalkylsilanes of this invention can be produced by a hydrocarbon-substituted Group VB element hydride-catalyzed reaction of an olefinic nitrile and a hydrogensilane having the formula

  (4)

wherein $b$, $c$, $(b+c)$, R and X have the above-defined meanings.

The hydrocarbon-substituted Group VB element hydride-catalyzed addition process can be carried out by forming a mixture of the olefinic nitrile, a silane represented by Formula 4 and a small or catalytic amount of a hydrocarbon-substituted hydride of an element taken from Group VB of the long form of the Periodic Table as catalyst for the reaction and heating the mixture to a temperature sufficiently elevated to cause the starting materials to react. There results, or is produced, a cyanoalkylsilane by the addition of a silyl group to the olefinic carbon atom of the nitrile further removed from the cyano group and by the addition of a hydrogen atom to the olefinic carbon atom of the nitrile closer to the cyano group.

Illustrative of the silane starting materials represented by Formula 4 are trichlorosilane, triethoxysilane, dichlorosilane, diethoxysilane, monochlorosilane, monoethoxysilane, methyldichlorosilane, ethyldiethoxysilane, diethylethoxysilane, dimethylchlorosilane, butylethylchlorosilane, phenyldichlorosilane, phenylethylethoxysilane, dipropylphenoxysilane and the like.

The olefinic nitrile starting materials employed in the hydrocarbon-substituted Group VB element hydride-catalyzed addition process are the aliphatic mono-olefinic nitriles which contain from three to ten carbon atoms to the molecule. Illustrative of such olefinic nitriles are acrylonitrile, methacrylonitrile, allyl cyanide, 1-cyano-3-butene, 1-cyano-4-pentene, 1-cyano-1-hexene and the like. Among these starting materials are the alpha-beta olefinically unsaturated nitriles, namely those nitriles in which the unsaturated grouping

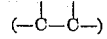

is directly bonded, through one of the carbon atoms thereof, to the carbon atom of the cyano group. Such olefinic nitriles are commonly known as the vinyl-type cyanides and can be represented graphically by the general formula:

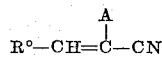

where R° is a hydrogen atom of an alkyl group as for example methyl, ethyl, propyl, butyl and the like and A is either a hydrogen atom or a methyl group. Illustrative of such vinyl-type cyanides are acrylonitrile, methacrylonitrile, crotononitrile and the like.

The hydrocarbon-substituted hydrides of the elements of Group VB of the long form of the Periodic Table which can be employed as catalysts in hydrocarbon-substituted Group VB element hydride-catalyzed addition process direct the addition of the silyl group of our starting nitrile further removed from the cyano group thereof and the addition of the hydrogen atom of the starting silane to the vicinal olefinic carbon atom. Such catalysts are the hydrocarbon-substituted hydrides of such elements which can be graphically represented by the formula:

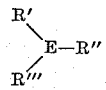

wherein R', R" and R''' represent monovalent hydrocarbon groups, as for example alkyl or aryl groups, which need not be necessarily the same. Illustrative of such alkyl groups are methyl, ethyl, propyl, isopropyl, butyl, isobutyl, pentyl and the like; while illustrative aryl groups are phenyl, tolyl, naphthyl, and the like. The letter E represents an element taken from Group VB of the Periodic Table as for example either nitrogen, phosphorus, arsenic, antimony or bismuth. Illustrative of such substituted hydrides are: trimethylamine, triethylamine, triphenylamine, triethylarsine, triethylphosphine, diethylmethylphosphine, tri-n-butylphosphine, triphenylphospine, triethylstibine, triphenylstibine, triphenylbismuthine and the like.

The amount of the catalyst employed in the hydrocarbon-substituted Group VB element hydride-catalyzed addition process is not narrowly critical. Thus, amounts of the hydrocarbon-substituted hydrides of the elements of Group VB of the Periodic Table of from as little as about 0.2 part to as much as about 10 parts by weight of the starting materials can be favorably employed. Preferably the catalyst is employed in an amount of from about 0.3 part to about 3 parts by weight per 100 parts of the total weight of the nitrile and silane starting materials. Amounts of the trihydrocarbyl substituted catalyst in smaller or greater quantities than the favorable range can also be employed. However, no commensurate advantage is obtained thereby.

Those cyanoalkylsilanes of this invention which are represented by Formula 1 wherein $a$ has a value of at least two (i.e. the gamma-cyanoalkylsilanes and the higher homologs thereof) can be produced by a platinum metal-catalyzed reaction of ($a$) an olefin in which the olefinic group

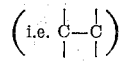

is removed by at least one carbon atom from the cyano group and ($b$) a hydrogensilane represented by Formula 4.

The platinum metal-catalyzed addition process can be carried out by forming a mixture of an olefinic nitrile, a silane represented by Formula 4 and a small or catalytic amount of a platinum metal as a catalyst for the reaction and heating the mixture to a temperature sufficiently elevated to cause the starting materials to react. There results, or is produced, a cyanoalkylsilane by the addition of a silyl group to the olefinic carbon atom of the nitrile further removed from the cyano group and by the addition of a hydrogen atom to the olefinic carbon atom of the nitrile closer to the cyano group.

The olefinic nitrile starting materials employed in the platinum metal-catalyzed addition process are the acylic aliphatic mono-olefinic nitriles in which the unsaturated grouping

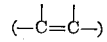

is removed by at least one carbon atom from the cyano group of the compound. The preferred olefinic nitriles are those compounds which contain from four to ten carbon atoms per molecule. Illustrative of such olefinic nitriles are: allyl cyanide, methallyl cyanide, 1-cyano-4-pentene and the like.

The platinum metals, which are employed as catalysts in the platinum metal-catalyzed addition process, direct the addition of the silyl group of our starting silane to the olefinic carbon atom of the starting nitrile further removed from the cyano group thereof and the addition of a hydrogen atom of the starting silane to the vicinal olefinic carbon atom. Such platinum metals include platinum, palladium and the like, as well as heterogeneous or multi-component mixtures containing such metals. The catalysts are preferably employed in a finely divided state and can be used either alone or in combination with an inert support. Suitable supports for the catalysts are asbestos, charcoal, calcium carbonate and the like. Instead of employing the platinum metals alone or in combination which an inert support, a heterogeneous or multi-component platinum-containing catalyst can be used. Illustrative of such heterogeneous catalysts is platinum deposited on the gamma allotrope of alumina. This heterogeneous catalyst has been found outstandingly effective in promoting the reaction between the starting materials. Multi-component catalysts of this type can contain from about 0.10 to about 5 parts or more of the platinum metal per 100 parts of the total weight of the overall catalyst.

The amounts of catalyst employed in the platinum metal-catalyzed addition process is not narrowly critical. Thus, amounts of the platinum metals of from about 0.02 part to about 2 parts or more per 100 parts of the total weight of the starting materials can be employed. When employing platinum metals in combination with an inert support or in the form of a heterogeneous or multi-component mixture, amounts of such mixtures of from as little as 0.2 part to as much as about 10 parts by weight per 100 parts of the total weight of the starting materials can be advantageously employed. Amounts of the catalysts whether employed alone, in combination with an inert support or as multi-component mixtures, in smaller or greater quantities than the ranges set forth hereinabove can also be employed. However, no commensurate advantage is obtained thereby.

The olefinic nitrile and silane starting materials can be employed in either of the above-described addition processes in amounts which can vary from about one half to three moles of the nitrile per mole of the silane. Preferably, the reactants are employed in stoichiometric amounts. Amounts of either of the starting materials in excess of the ratios set forth above can also be employed; however, no commensurate advantage is obtained thereby.

To facilitate observation and at the same time to favor closer control of the reactions conditions, either of the above-described addition processes can be carried out in pressure vessels or bombs, with agitation being provided, if desired, by continuous shaking. Similar results can be obtained with flowing reactants in apparatus of known design permitting the maintenance of a closed system. In these reactions it is desirable to maintain sufficiently high concentrations of the reactants (as measured for example in moles per liter of reaction space) to promote effective contact between the molecules to be reacted. When one of the reactants is a gas or a liquid readily volatile at the reaction temperature and the reaction mixture is permitted to expand freely on heating, the concentration of that reactant will fall to a low value thus considerably slowing the reaction rate. If, however, the reactants are charged to a closed vessel which is sealed before heating, the initial concentration of any reactant falls off through its consumption by the reaction. If a reactant is a gas, it may be desirable to charge the reaction vessel to a considerable pressure to secure an adequate concentration and reaction rate and also to supply enough of the reactant to produce an acceptable quantity of the product.

The temperatures which can be employed in carrying out either of the above-described addition processes are not narrowly critical and can vary over a wide range. For example, temperatures as low as 40° C. and as high as 350° C. can be advantageously employed. When conducting the process in a closed vessel, a temperature in the range from about 125° C. to about 250° C. is preferred when platinum metal is the catalyst and a temperature span 75° C. to 250° C. is preferred when a hydrocarbon-substituted Group VB element hydride is the catalyst. Under such conditions, a reaction period of from two to five hours is suitable. Temperatures of from about 175° C. to about 300° C. are preferred when conducting the process in apparatus which provides for the flow of the reactants and products while maintaining the conditions of a closed system. In such systems, where the pressure can range from atmospheric up to 4000 pounds per square inch and higher, the time required for the reaction to take place can be as short as 0.005 minute.

In carrying out either of the above-described addition processes, the product initially obtained comprises a mixture which includes the main cyanoalkylsilane reaction product as well as some unreacted nitrile and unreacted silane starting compounds. The desired addition product formed by the addition of a silyl group to the olefinic carbon atom of the nitrile further removed from the cyano group and by the addition of a hydrogen atom to the olefinic carbon atom closer to the cyano group can be recovered from the initially obtained reaction mixture by a distillation procedure which is preferably conducted under reduced pressure.

Bis(cyanoalkyl)silanes are produced in the practice of either of the above-described addition processes when our starting nitriles are reacted with silanes containing at least two hydrogen atoms bonded to the silicon atom thereof. In such instances the nitrile starting material is preferably employed in an amount of at least twice the number of moles of the starting silane. The products of the reaction include, in addition to the desired bis compound, a cyanoalkylhydrogensilane. By way of illustration, when two moles of allyl cyanide are reacted with one mole of dichlorosilane in the presence of a platinum metal there is obtained bis(gamma-cyanopropyl)dichlorosilane and gamma-cyanopropylhydrogendichlorosilane. Following such procedures the tris compounds as well as cyanoalkylsilanes containing two hydrogen atoms bonded to the silicon atom thereof can also be obtained if a silane containing three hydrogen atoms and one hydrolyzable group bonded to the silicon atom thereof is employed as the starting material.

Those cyanoalkylsilanes of this invention which are represented by Formula 1 wherein $a$ has a value of at least two and wherein X is a hydrocarbonoxy group can also be produced by a metathesis reaction between a metal cyanide and a haloalkylhydrocarbonoxysilane having the formula:

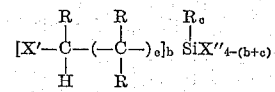

wherein X' is a halogen atom, X" is a hydrocarbonoxy group, $e$ has a value of at least two and R, $b$, $e$ and $(b+c)$ have the above defined means.

The metathesis process can be carried out by forming a reactive mixture of a metal cyanide (such as an alkali or alkaline earth metal cyanide) with a haloalkylhydrocarbonoxysilane (such as chloroalkylhydrocarbonoxysilane). The reaction that takes place is a metathesis and may be graphically represented by the following general equation which depicts, for the purpose of illustration, the reaction of sodium cyanide with gamma-chloropropyltriethoxysilane:

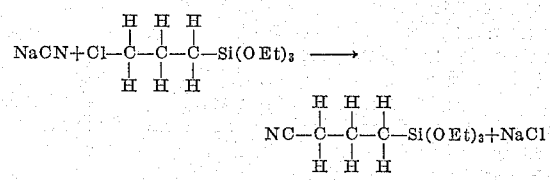

The metal cyanide starting materials which can be employed in the metathesis process to react with a chloroalkylhydrocarbonoxysilane are the ionic metal cyanides as, for example, the alkali metal and alkaline earth metal cyanides. It is preferable to employ the alkali metal cyanides such as sodium cyanide, potassium cyanide and the like. Illustrative of the alkaline earth metal cyanides which can be employed in our process are barium cyanide, calcium cyanide, and the like.

While the reactants in the metathesis process, namely the metal cyanide and chloroalkylhydrocarbonoxysilane, can be employed in chemically equivalent amounts based on the cyanide and chlorine content of the respective starting materials, it is preferable that the metal cyanide be employed in amounts greater than the chemical equivalent. For example, it has been found desirable to use from about 1.5 to 4 chemical equivalents of the metal cyanide, based on the cyanide content thereof, per chemical equivalent of the chloroalkylhydrocarbonoxysilane, based on the chlorine content thereof. Amounts of the metal cyanide in excess of the greater ratio set forth above can also be employed, however, no material advantage is obtained thereby.

In the practice of the metathesis process the reaction of the chloroalkylhydrocarbonoxysilane and the ionic metal cyanide is carried out within a highly polar liquid organic compound in which the starting materials are mutually soluble to an extent whereby the two reacting substances are brought into reactive contact. In the absence of such a solvent, the reaction does not appear to take place.

The reaction between a chloroalkylhydrocarbonoxysilane and an ionic metal cyanide within a highly polar liquid organic compound is a liquid-solid phase reaction which is driven toward completion when the metal chloride reaction product is less soluble in the highly polar liquid organic compound than the corresponding metal cyanide starting material.

Illustrative of the organic liquid compounds in which the starting materials are mutually soluble to the extent whereby they are brought into reactive contact, and in which the starting ionic metal cyanides are more soluble than the corresponding metal chloride reaction products, are the highly polar nitrogen-containing liquid organic compounds. Most suitable for use in this process are those highly polar nitrogen-containing liquid organic compounds commonly known as the dialkyl acylamide compounds which can be graphically depicted by the structural formula:

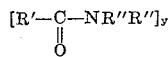

where R' is a mono-, di- or trivalent, saturated or unsaturated, aliphatic hydrocarbyl group and preferably either an alkyl, alkylene or alkenylene group containing from 1 to 5 carbon atoms, R'' and R'' are alkyl groups, preferably methyl or propyl groups and $y$ is a numeral having a value of 1, 2 or 3. Illustrative of such compounds are: N,N-dimethylformamide, N,N-diethylformamide, N,N-dipropylformamide, N,N-dimethylacetamide, N,N - dimethylacetamide, N,N - diethylpropionamide, N,N,N',N' - tetramethylmalonamide, N,N,N',N' - tetramethyl - alphaethylmalonamide, N,N,N',N' - tetramethylglutaramide, N,N,N',N'-tetramethylsuccinamide, N,N,N', N'-tetramethylfumaramide, N,N,N',N'-tetramethylitaconamide. The dialkyl acylamide compounds that are preferably employed are the dialkylformamides.

One of the advantages derived from the use of highly polar nitrogen-containing liquid organic compounds as solvents for the metathesis reaction lies in the substantial solubility of the metal cyanide starting materials therein as compared to relatively poor solubility of the corresponding metal chloride in the same solvent. Such extreme differences in solubility permit the reaction to be readily driven toward completion. The table below, based on semi-quantitative data is provided to illustrate the substantial differences in the solubility of typical metal cyanide starting materials and their corresponding metal chloride reaction products in a highly polar liquid organic nitrogen-containing compound.

Solubility in N,N-dimethylformamide:

| | Grams per 100 cc. |
|---|---|
| Potassium cyanide | 0.22 |
| Sodium cyanide | 0.76 |
| Potassium chloride | Less than 0.05 |
| Sodium chloride | Less than 0.05 |

In carrying out the metathesis process, the amount of solvent employed is not narrowly critical and can vary over wide limits. Preferably, the amount of solvent employed should be sufficient to completely dissolve the chloroalkylhydrocarbonoxysilane starting materials, which for the most part are miscible with the solvent in all proportions. Amounts of the solvent which vary from about 20 parts to about 100 parts for each 100 parts of the combined weights of the starting materials most suitable. Amounts of the solvent below about 20 parts by weight and above 100 parts by weight can also be employed, however, no commensurate advantage is obtained thereby.

The metathesis reaction can be conducted at a temperature which can vary from about 0° to 200° C. and above. However, it is desirable to avoid temperatures so high as to favor cleavage of the carbon to silicon bond or bonds of the silane and thus, decrease the yield of the cyanoalkyl product. In the practice of this process, it is preferable to employ temperatures within the range of from about 25° C. to about 175° C. When carrying out the process in the presence of a solvent, it is preferred that the reaction mixture be heated to and maintained at its boiling temperature, under total reflux, over the period of the reaction.

Starting with potassium cyanide and gamma-chloropropyltriethoxysilane, which are illustrative of two of the starting materials, used in the metathesis process, it will be seen from the equation set forth hereinabove, that in the reaction the cyano group of the potassium cyanide will displace the chlorine group of the silane starting material with a consequent formation of cyanopropyltriethoxysilane. In a like manner, when a polychloroalkylsilane is employed as the silane component in our process, the chlorine groups thereof are displaced by cyano groups supplied by the potassium cyanide or other metal cyanide molecules. Obviously, as the reaction proceeds the concentrations of the reactants in the reaction mixture decrease from their initial values while the concentrations of the products increase from an initial value of zero. Using solvents in the metathesis process, potassium chloride precipitates from solution during the course of the reaction and any undissolved potassium cyanide present goes into solution at approximately the same rate at which the potassium chloride precipitates. As far as is known, the course of the metathesis reaction between an ionic metal cyanide and a chloroalkylhydrocarbonoxysilane in the presence of a highly polar liquid organic solvent does not depart from the well established laws or principles applicable to opposing reactions, dynamic equilibrium and equilibrium concentrations, enunciated as early as 1876 by Guldburg and Waage. The point of equilibrium in the direction of the formation of the products by the precipitation of the alkali or alkaline earth metal chloride which accounts for increased yields of our process. Of course, the point of equilibrium can also be shifted in the direction of the formation of the products by other expedients as for example by decreasing the concentration of the cyanoalkylhydrocarbonoxysilane product as by distillation.

The cyanoalkylhydrocarbonoxysilane reaction products are soluble in the highly polar liquid organic nitrogen-containing compounds employed as solvents in the metathesis process. Such cyanoalkylhydrocarbonoxysilanes normally have boiling temperatures different from those of the solvents employed. Therefore, they can be removed from solution by distillation techniques. Obviously, the more efficient the distillation column the better the results, particularly where the boiling points of the desired product and solvent lie close together.

The reaction between an ionic metal cyanide and a chloroalkylhydrocarbonoxysilane in the presence of a highly polar liquid organic nitrogen-containing compound is preferably conducted under substantially anhydrous conditions because of the susceptibility of the cyano group and the alkoxy group to undergo hydrolysis. However, the presence of some moisture or water will not completely inhibit the reaction or destroy the reactants, although the yield of the desired products is somewhat lowered. In the practice of the process it is preferable to employ starting materials which are in a substantially anhydrous state. Thus, if desired, the starting materials may be passed over anhydrous calcium sulfate to remove any moisture contained therein.

The cyanoalkylhydrocarbonoxysilanes of this invention can be employed as the starting materials for the production of the corresponding cyanoalkylchlorohydrocarbonoxysilanes as well as the corresponding cyanoalkylchlorosilanes. Such can be accomplished by reacting, under substantially anhydrous conditions, a cyanoalkylhydrocarbonoxysilane with a chlorinating compound in the presence of a suitable solvent. Examples of chlorinating compounds which can be employed include phosphorous trichloride, phosphorous pentachloride, benzyl chloride, thionyl chloride, silicon tetrachloride and the like. Illustrative of the preparation of a cyanoalkylchlorosilane by this process is the production of delta-cyanobutyltrichlorosilane which can be accomplished by adding under substantially anhydrous conditions a solution of phosphorous pentachloride to a solution of delta-cyanobutyltriethoxysilane and heating the mixture to its boiling temperature. Delta-cyanobutyltrichlorosilane as well as the two delta-cyanobutylchloroethoxysilanes can be recovered by distillation of the reaction mixture.

The cyanoalkylsilanes of this invention lend themselves to a wide variety of commercial applications. By way of illustration, the cyanoalkylsilanes, as for example beta-cyanoethyltriethoxysilane, can be employed as the starting material in the preparation of the corresponding aminoalkylsilanes, as for example gamma-amminopropyltriethoxysilane, which latter compounds have been found extremely useful as sizes for fibrous glass materials when employed in combination with epoxy, phenolic and melamine condensation resins for the production of fibrous glass laminates. The production of aminoalkylsilanes is accomplished by hydrogenating the cyanoalkylsilanes of the present invention under pressure and in the presence of a catalyst at a temperature of about 100° C. The reaction that takes place can be depicted by the following equation which illustrates the hydrogenation of beta-cyanoethyltriethoxysilane:

$(EtO)_3SiCH_2CH_2CN + H \rightarrow (EtO)_3SiCH_2CH_2CH_2NH_2$

The cyanoalkylhalosilanes of this invention can be employed as the starting materials in the preparation of their corresponding cyanoalkylhydrocarbonoxysilanes by reacting such materials with an alcohol. By way of illustration, beta-cyanoethyltriethoxysilane is produced by reaction of beta-cyanoethyltrichlorosilane with ethanol. Such is accomplished by the steps of forming a reactive mixture of beta-cyanoethyltrichlorosilane and ethanol, with or without a solvent for the silane.

The cyanoalkylsilanes of this invention, by virtue of the hydrolyzable group or groups bonded to the silicon atom thereof, can be hydrolyzed alone or along with hydrocarbonsilanes (e.g. dimethyldiethoxysilane), to produce the cyanoalkylsiloxanes of this invention. Hydrolysis of the silanes is accomplished by the addition of such silanes to water. The hydrolysis reaction can be conducted by first mixing the silanes with a liquid organic compound completely miscible therewith, as for example, diethyl ether and adding such mixture to a medium comprising a mixture of water, ice and the organic ether. By way of illustration, beta-cyanoethylsiloxane is produced by forming a mixture of beta-cyanoethyltrichlorosilane with diethyl ether, as for example, 100 parts of the silane and 20 parts of the ether and adding the mixture to a beaker containing a mixture of water, ice and diethyl ether. There results a two-phase system, one of the phases being aqueous hydrochloric acid and the other phase being beta-cyanoethylpolysiloxane in diethyl ether. The aqueous hydrochloric acid phase is decanted and the siloxane-solvent phase washed with water until the washings are neutral. Upon evaporation of the ether or other solvent from the nonaqueous phase, preferably under reduced pressure there is obtained as a residue a partially condensed beta-cyanoethylpolysiloxane. The partially condensed material can be completely cured to a hard brittle polymer. In a like manner, the difunctional beta-cyanoethylsilanes as well as the monofunctional beta-cyanoethylsilanes can be hydrolyzed to polymeric compositions.

The difunctional cyanoalkylsilanes of this invention form cyclic as well as linear polymers upon hydrolysis. For example, beta-cyanoethyl(methyl)diethoxysilane upon hydrolysis produces, in addition to a linear beta-cyanoethyl(methyl)polysiloxane, various cyclic siloxanes such as the cyclic trimer, tetramer, pentamer and hexamer of beta-cyanoethyl(methyl)siloxane.

The cyanoalkylsiloxanes of this invention find use in numerous applications depending upon the type of polymers prepared. By way of illustration, the trifunctional substitute silanes upon hydrolysis and complete condensation become highly cross-linked, hard, infusible polymers. Such polymers are useful as protective coatings for metallic surfaces which are normally subjected to temperatures as high as 200° C. The new linear and cyclic siloxanes find use as oils in the lubrication of moving metal surfaces. The new monofunctional silanes as well as their hydrolysis products, namely the corresponding dimers, can be employed as endblocking compounds to control the chain length of linear siloxanes in the production of oils.

Those cyanoalkylsilanes which are represented by Formula 1 wherein $a$ has a value of at least two and those cyanoalkylsiloxanes which contain the group represented by Formula 2 wherein $a$ has a value of at least two are uniquely suited for use as starting materials in producing remarkably stable derivatives by oxidation and halogenation reactions involving the hydrogen atom attached to carbon atom to which the cyano group is attached. The above-mentioned oxidation reactions occur, as represented by the following skeletal equation, to produce omega-cyano, omega-hydroxyalkylsilicon compounds:

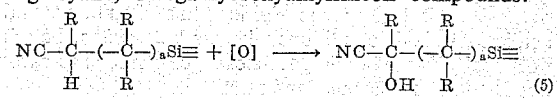
(5)

wherein R has the meaning defined for Formula 1 and $a$ has a value of at least two. The above-mentioned halogenation reactions occur, as represented by the following skeletal equation, to produce omega-cyano, omega-haloalkylsilicon compounds:

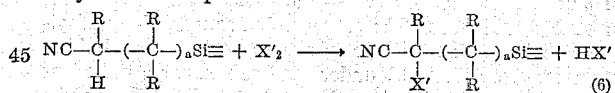
(6)

wherein R has the meaning defined for Formula 1, $a$ has a value of at least two and X′ is a halogen atom.

The oxidation reaction represented by Equation 5 can be conducted by any convenient method. One such method involves introducing (e.g. bubbling) ozone into a solution of the cyanoalkylsilicon compound dissolved in a halohydrocarbon solvent (e.g. ethylene dichloride). This method can be conducted at a temperature from −10° C. to +50° C. The desired oxidation product can be isolated by conventional methods (e.g., by distillation or extraction).

The halogenation reaction represented by Equation 6 can be conducted by irradiating a mixture of the cyanoalkylsilicon compound, a gaseous halogen and a hydrogen halide with ultra violet light. The mixture can be maintained at a temperature from 0° C. to 150° C. and can contain 1 wt. percent to 10 wt. percent of the hydrogen halide based on the weight of the cyanoalkylsilicon compound. The hydrogen halide is admixed with the cyanoalkylsilicon compound at a temperature of 0° C. to 80° C. prior to forming the mixture of these components with the gaseous halogen. The desired halogenation product can be isolated by conventional methods (e.g., by distillation or extraction).

The cyano- and hydroxy-substituted alkylsilicon compounds produced by the oxidation reaction represented by Equation 5 can be employed in a variety of applications. By way of illustration, these compounds can be reacted through the hydroxyl groups therein with organic polymers that are reactive with hydroxyl groups (i.e. alkyd polymers that contain unreacted carboxy groups) to produce modified organic polymers containing cyano and silicone moieties. Such modified organic polymers possess increased solvent resistance and increased thermal stability as compared to the unmodified organic polymers.

The cyano- and halo-substituted alkylsilicon compounds produced by the halogenation reaction represented by Equation 6 can be employed in a variety of applications. By way of illustration, these compounds can be reacted through the halogen atoms therein with organic materials that are reactive with halogen atoms to produce various derivatives. As a further illustration, these compounds can be dehydrohalogenated to produce cyano-substituted alkenylsilicon compounds which can be polymerized through the alkenyl groups therein to produce coatings for metal surfaces.

The cyano- and hydroxy-substituted alkylsilicon compound produced by the reaction represented by Equation 5 and the cyano- and halo-substituted alkylsilicon compounds produced by the reaction represented by Equation 6 are remarkably stable materials. By way of illustration, the carbon to silicon bond linking the cyano-containing moieties therein to the silicon atom is not readily cleaved by hydrolysis even in acidic or basic media. In this respect, these compounds are remarkably different from beta-cyano, beta-hydroxy-ethylsilicon compounds and beta-cyano, beta-halo-ethylsilicon compounds. The carbon to silicon bond linking the cyano-containing moieties to silicon in these latter compounds is relatively unstable and hence, for example, this bond is readily cleaved by hydrolysis, particularly under acidic or basic conditions.

As an illustration of the different in stability mentioned above, gamma-cyano, gamma-hydroxy-propylpolysiloxane does not undergo cleavage of silicon to carbon bonds under acidic hydrolysis conditions whereas beta-cyano, beta-hydroxypolysiloxane undergoes cleavage of silicon to carbon bonds under the same conditions.

The following examples illustrate the present invention:

Example 1

To a flask connected to a reflux condenser were added 0.41 mole (99.7 g.) of gamma-chloropropyltriethoxysilane, 0.82 mole (60 g.) of anhydrous sodium cyanide, and 250 milliliters (236 g.) of anhydrous N,N-dimethylformamide. The mixture was then heated to its boiling temperature (155° C.) under total reflux, for a period of six hours. After heating, the contents of the flask were cooled and passed through a "Magnesol" filter to remove the solid content therefrom. The filtrate was then placed in a flask connected to a fractionating column and distilled under reduced pressure. There was obtained 84 g. of a product boiling at a temperature of from 79° to 80° C. under a pressure of 0.6 mm. Hg. This product was identified as gamma-cyanopropyltriethoxysilane by its boiling temperature and by its density and refractive index at 25° C. ($d_4^{25}$ 0.961, $n_D^{25}$ 1.4152). Other procedures employed in the identification of gamma-cyanopropyltriethoxysilane product included infrared spectra analysis as well as elemental analysis for carbon, silicon, and nitrogen content and the determination of the molar refraction of the product. Listed below are the values in percent by weight obtained from such elemental analysis and the value obtained from the molar refraction determination as well as the corresponding calculated values for gamma-cyanopropyltriethoxysilane.

|  | Gamma-cyanopropyltriethoxysilane | |
| --- | --- | --- |
|  | Found | Calculated |
| Carbon | 51.8 | 51.9 |
| Silicon | 12.0 | 12.1 |
| Nitrogen | 6.3 | 6.1 |
| Molar Refraction | 60.33 | 59.95 |

The 84 g. of gamma-cyanopropyltriethoxysilane obtained represented a yield of 88 percent based on the number of moles of the starting gamma-chloropropyltriethoxysilane.

Example 2

To a 500 ml., three-necked flash equipped with a stirrer, thermometer and reflux condenser, were added 0.16 mole (40.1 g.) of delta-chlorobutyltriethoxysilane, 0.30 mole (15 g.) of anhydrous sodium cyanide and 100 ml. (94.5 g.) of anhydrous N,N-dimethylformamide. The mixture was then heated to its boiling temperature (about 160° C.), under total reflux, for a period of four hours. After heating, the contents of the flask were cooled to room temperature and passed through a diatomaceous earth filter to remove the solids contained therein. The filtrate was then placed in a flask connected to a fractionating column and distilled. There was obtained 30 g. of a product boiling at a temperature of from 83° C. to 85° C. under a pressure of 0.7 mm. Hg. This product had a density, $d_4^{25}$ of 0.956 and a refractive index $n_D^{25}$ of 1.4207. The product was identified as delta-cyanobutyltriethoxysilane by elemental analysis for carbon, hydrogen, silicon and nitrogen content. The values obtained, in percent by weight appear in the table below and are compared with the corresponding calculated values for delta-cyanobutyltriethoxysilane.

|  | Delta-cyanobutyltriethoxysilane | |
| --- | --- | --- |
|  | Found | Calculated |
| Carbon | 53.5 | 53.84 |
| Hydrogen | 9.8 | 9.45 |
| Silicon | 11.0 | 11.44 |
| Nitrogen | 6.2 | 5.71 |

The 30 g. of delta-cyanobutyltriethoxysilane obtained, represented a yield of 78 percent based on the number of moles of the starting delta-chlorobutyltriethoxysilane.

Example 3

To a flask equipped with stirrer, thermometer and reflux condenser were added 0.5 mole (90.3 g.) of gamma-chloropropyldimethylethoxysilane, 1.0 mole (49 g.) of anhydrous sodium cyanide and 150 ml. (140 g.) of N,N-dimethylformamide. The mixture in the flask was heated, while stirring, to its boiling temperature (approx. 150° C.) under total reflux, for a period of six hours. The contents of the flask were cooled to room temperature and filtered to remove the solids therefrom. The removed solids were washed several times with petroleum ether, the washings combined with the filtrate and the mixture distilled under reduced pressure in a flask connected to a fractionating column. There was obtained 68.5 g. of gamma-cyanopropyldimethylethoxysilane boiling at a temperature of 115–116° C. under a pressure of 23 mm. Hg. Gamma-cyanopropyldimethylethoxysilane has a refractive index, $n_D^{25}$ of 1.4236. Elemental analysis of the obtained gamma-cyanopropyldimethylethoxysilane was conducted for carbon, hydrogen, nitrogen and ethoxy group content. The values obtained appear in the table below in terms of percent by weight and are compared with the corresponding calculated values for the compound.

|  | Gamma-cyanopropyldimethylethoxysilane | |
| --- | --- | --- |
|  | Found | Calculated |
| Carbon | 55.5 | 56.0 |
| Hydrogen | 9.6 | 10.0 |
| Nitrogen | 8.1 | 8.2 |
| Ethoxy group | 25.4 | 26.3 |

Example 4

To a 1000 ml., three-necked, round-bottomed flask equipped with a stirrer, reflux condenser and thermometer was added 1.0 mole (240.8 g.) of gamma-chloropropyltriethoxysilane, 1.5 moles (73.5 g.) of sodium cyanide and 150 cc. (136 g.) of N,N-diethylformamide. The mixture was maintained, while being stirred, at a temperature between 145°–150° C. for a period of about 19 hours. The contents of the flask were then cooled to room temperature and passed through a filter to remove the solids therefrom and the filtrate heated under reduced pressure to evaporate the solvent. After removing the solvent, the product was placed in a flask connected to a Vigreux column and distilled under reduced pressure. There was obtained 104.1 grams of gamma-cyanopropyltriethoxysilane boiling at a temperature of 83–86° C. under a pressure of 0.8 to 1.2 mm. Hg ($n_D^{25}$ 1.4152).

Bis(cyanoalkyl)hydrocarbyloxysilanes, tris(cyanoalkyl)hydrocarbyloxysilanes and polycyanoalkylhydrocarbyloxysilanes as well as their corresponding chlorosilanes are also prepared in accordance with the procedures disclosed above. For example, bis(delta-cyanobutyl)diethoxysilane is prepared by reacting 1.5 equivalent weights (97 g.) of potassium cyanide, based on the cyanide content thereof, with one equivalent weight (150.5 g.) of bis(delta-chlorobutyl)diethoxysilane based on the chlorine content thereof within 150 cc. (136 g.) of N,N-diethylformamide. Tris(delta-cyanobutyl)ethoxysilane is prepared by reacting 1.5 equivalent weights (73.5 g.) of sodium cyanide, based on the cyanide content thereof with one equivalent weight (115.8 g.) of tris(delta-chlorobutyl)ethoxysilane based on the chlorine content thereof, with 100 cc. (90.6 g.) of N,N-diethylformamide. In a like manner, gamma,delta-dicyanobutyltriethoxysilane is prepared by reacting 1.5 equivalent weights (97. g.) of potassium cyanide with 1 equivalent weight (144.5 g.) of gamma,delta-dichlorobutyltriethoxysilane, based on the chlorine content thereof, within 100 cc. (90.6 g.) of N,N-diethylformamide.

Example 5

To a stainless steel pressure vessel were charged 0.22 mole of delta-cyanobutyltriethoxysilane, 2 grams of Raney nickel and 25 ml. of ethanol. Ammonia was then charged to the vessel until the pressure therein reached 100 pounds per square inch. After the addition of the ammonia, hydrogen was charged to the vessel until the pressure therein reached 1500 pounds per square inch. The contents of the vessel were then heated at a temperature of 130° C. for a period of 24 hr. The vessel was then cooled at room temperature and the contents thereof passed through a filter to remove the solid material therefrom. The filtrate was then placed in a flask connected to a Vigreux column and distilled under reduced pressure. There was obatined 0.132 mole of a product boiling at a temperature of 73–74° C. under a pressure of 0.45 mm. Hg and having a refractive index, $n_D^{25}$ of 1.4260 and a density, $d_4^{25}$ of 0.926. This product was identified as epsilon-aminopentyltriethoxysilane by elemental analysis as well as analysis for Molar Refraction and Neutralization Equivalent. The values obtained appear in the table below and are compared with the corresponding calculated values for epsilon-aminopentyltriethoxysilane.

| | Epsilon-aminopentyltriethoxysilane | |
| --- | --- | --- |
| | Found | Calculated |
| Carbon, percent by weight | 52.9 | 53.4 |
| Hydrogen, percent by weight | 10.8 | 11.0 |
| Silicon, percent by weight | 11.3 | 11.3 |
| Nitrogen, percent by weight | 5.7 | 5.66 |
| Molar Refraction | 68.7 | 68.3 |
| Neutralization Equivalent | 245 | 247.4 |

Example 6

A No. 181 glass cloth, which had been previously heat cleaned, was immersed in a solution consisting of equal parts by weight of water and ethanol and containing 1.3 percent by weight of the aqueous admixture of epsilon-aminopentyltriethoxysilane. After removal from solution, the glass cloth was drained and air dried at room temperature to remove the solvent therefrom.

Laminates were prepared from a portion of the treated glass cloth by laying up and curing in accordance with customary practices, alternating layers of the cloth and a commercial melamine-aldehyde condensation polymer. The laminates, comprising 13 plies, were found to have a dry flexural strength of 57,000 pounds per square inch and a wet flexural strength of 51,000 pounds per square inch. Laminates of the same composition with the exception that the fibrous glass cloth was unsized were found to have a dry strength of only 25,000 pounds per square inch and a wet strength of only 14,000 pounds per square inch.

Example 7

To a 500 cc., three-necked flask equipped with a condenser, dropping funnel, thermometer and magnetic stirrer was added a solution comprising 0.1 mole (23.1 g.) of gamma-cyanopropyltriethoxysilane dissolved in 10 grams of anhydrous chloroform. While stirring the solution there was slowly added thereto, by means of the dropping funnel, a mixture comprising 0.1 mole (20.8 g.) of phosphorous pentachloride dissolved in a mixture of 170 grams of chloroform and 10 grams of carbon disulfide. During the addition the temperatures of the contents of the flask rose from 27° C. to 55° C. After the addition, the contents of the flask were heated to the boiling temperature (56–60° C.) for a period of three hours. The chloroform and carbon disulfide were distilled from the reaction mixture and the product placed in a flask connected to a fractionating column. There was obtained a yield of 76.7 percent, based on the number of moles of starting materials, of a product boiling at a temperature of 84–89° C. under a pressure of 1 mm. Hg. This fraction was identified as a mixture of gamma-cyanopropyltrichlorosilane and gamma-cyanopropylchlorodiethoxysilane by infra-red and elemental analyses.

Example 8

To a 500 ml., three-necked, round bottom flask equipped with stirrer, reflux condenser, and thermometer was charged 50 grams of gamma-cyanopropylmethyldiethoxysilane dissolved in 200 cc. of diethyl ether and 50 cc. of a 5 percent water solution of sodium hydroxide. The mixture was stirred for a period of 24 hours. There resulted a two-phase system, one phase consisting of aqueous ethanol and the other phase consisting of gamma-cyanopropylsiloxane and diethyl ether. The aqueous ethanol phase was decanted and the ether phase washed with water until neutral and dried over anhydrous calcium chloride. The ether solution was concentrated under reduced pressure and there resulted 15.4 grams of a colorless oil. Distillation of the colorless oil in a Hickman Still gave 11 grams of the cyclic trimer of gamma-cyanopropylmethylsiloxane boiling at a temperature of 242°–250° C. under a pressure of 0.2 mm. Hg. A small amount of the cyclic tetramer of gamma-cyanopropylmethylsiloxane boiling at a temperature of 175°–180° C. under a reduced pressure of 0.025 mm. Hg., the cyclic pentamer of gamma-cyanopropylmethylsiloxane boiling at a temperature of 200°–210° C. under a reduced pressure of 0.025 mm. Hg and the cyclic hexamer of gamma-cyanopropylmethylsiloxane boiling at a temperature of 230°–300° C. under a reduced pressure of 0.01 mm. Hg was obtained.

The cyclic trimer of gamma-cyanopropylmethylsiloxane has a refractive index of $n_D^{25}$ of 1.4558 and was identified by elemental as well as infra-red analysis. The following table contains the data obtained from the elemental analysis for carbon, hydrogen, silicon and nitrogen content of the siloxane. Also appearing in the table are the corresponding calculated values of the elements for the compound.

|  | Cyclic Trimer of Gamma-cyanopropylmethylsiloxane | |
|---|---|---|
|  | Found | Calculated |
| Carbon, percent by weight | 47.3 | 47.2 |
| Hydrogen, percent by weight | 7.5 | 7.1 |
| Silicon, percent by weight | 20.4 | 22.2 |
| Nitrogen, percent by weight | 10.4 | 11.0 |
| Molecular Weight | 380 | 381 |

The cyclic tetramer, pentamer and hexamer of gamma-cyanopropylmethylsiloxane were also identified by infrared analysis and, in addition, were found to have the following refractive indices:

Cyclic tetramer of gamma-cyanopropylmethylsiloxane—
$n_D^{25}$ 1.4573
Cyclic pentamer of gamma-cyanopropylmethylsiloxane—
$n_D^{25}$ 1.4582
Cyclic hexamer of gamma- cyanopropylmethylsiloxane—
$n_D^{25}$ 1.4606

*Example 9*

Following the procedure disclosed in the above example, gamma-cyanopropylphenyldiethoxysilane was hydrolyzed and the product obtained consisted for the most part of the cyclic tetramer of gamma-cyanopropylphenylsiloxane. The cyclic tetramer of gamma-cyanopropylphenylsiloxane was identified by infra-red analysis and has a refractive index $n_D^{25}$ of 1.5488.

*Example 10*

Following the procedure disclosed in Example 8 gamma-cyanopropylethyldiethoxysilane was hydrolyzed and the product obtained consisted for the most part of the cyclic tetramer of gamma-cyanopropylethylsiloxane. The cyclic tetramer of gamma-cyanopropylethylsiloxane was identified by infra-red analysis as well as by elemental analysis and has a refractive index $n_D^{25}$ of 1.4636. The data obtained from the elemental analysis appears in the table below and was compared with the corresponding theoretical values of the elements of the compound.

|  | Cyclic Tetramer of Gamma-cyanopropylethylsiloxane | |
|---|---|---|
|  | Found | Calculated |
| Carbon, percent by weight | 47.5 | 49.6 |
| Hydrogen, percent by weight | 7.6 | 7.8 |
| Silicon, percent by weight | 18.9 | 19.8 |
| Nitrogen, percent by weight | 9.9 | 9.9 |

*Example 11*

To a 300 cc. stainless steel pressure vessel were charged 0.9 mole (60.4 grams) of allyl cyanide, 0.9 mole (102 grams) of methyldichlorosilane and 3.6 grams of platinum deposited on gamma alumina (containing 2 percent by weight of platinum). The vessel was sealed and heated to a temperature of 200° C. for a period of two hours. After heating the vessel was cooled to room temperature and the product, a brown liquid, removed therefrom and placed in a flask connected to a distillation column. The contents of the flask were heated to its boiling temperature under reduced pressure and there was obtained 138 grams of gamma-cyanopropylmethyldichlorosilane boiling at a temperature of 79 to 82° C. under a reduced pressure of 1 mm. Hg. Gamma-cyanopropylmethyldichlorosilane is water white in color and has a refractive index $n_D^{25}$ of 1.4568 and a density of $d_4^{25}$ of 1.14. Gamma-cyanopropylmethyldichlorosilane was identified by infra-red analysis and by analysis for hydrolyzable chlorine (found 38.9 percent by weight of hydrolyzable chlorine, theory 38.9 percent by weight). The 138 grams of product obtained represented a yield of 88.6 percent based on the total number of moles of starting materials.

*Example 12*

To a one liter flask equipped with a stirrer, condenser and dropping funnel was added a solution consisting of 1.2 moles (211.5 grams) of gamma-cyanopropylmethyldichlorosilane dissolved in 200 ml. of anhydrous diethyl ether. There was then slowly added to the flask, by means of the dropping funnel, 2.3 moles (106.9 grams) of ethanol. During the addition the contents of the flask were continuously stirred. The product obtained was placed in a flask connected to a distillation column and heated to its boiling temperature under reduced pressure. There was obtained 190 grams of gamma-cyanopropylmethyldiethoxysilane boiling at a temperature of 83.5 to 85° C. under a reduced pressure of 1.7 mm. Hg Redistillation of this fraction at a lower pressure indicated the boiling point of gamma-cyanopropylmethyldiethoxysilane to be 67 to 68° C. under a reduced pressure of 1 mm. Hg. Gamma-cyanopropylmethyldiethoxysilane has a refractive index $n_D^{25}$ of 1.4206 and a density of $d_4^{25}$ of 0.929. The compound was identified by analysis for silicon and ethoxy content. The data obtained appears in the table below:

|  | Gamma-cyanopropylmethyldiethoxysilane | |
|---|---|---|
|  | Found | Calculated |
| Silicon | 13.3 | 13.2 |
| Ethoxy | 42.6 | 42.6 |

*Example 13*

To a 300 cc. stainless steel pressure vessel were added 0.59 mole (40 grams) of allyl cyanide, 0.59 mole (76.3 grams) of ethyldichlorosilane and 2.3 grams of platinum deposited on gamma alumina (containing 2 percent by weight of platinum). The vessel was sealed and heated to a temperature of 200° C. for a period of two hours. After heating the vessel was cooled to room temperature and the dark brown liquid product placed in a flask connected to a distillation column. There was obtained 94.5 grams of gamma-cyanopropylethyldichlorosilane boiling at a temperature of 75 to 78° C. under a reduced pressure of 0.5 mm. Hg. Gamma-cyanopropylethyldichlorosilane has a refractive index $n_D^{25}$ of 1.4617 and a density of $d_4^{25}$ of 1.12. The compound was identified by infra-red analysis and by analysis for hydrolyzable chlorine content as well as the determination of the molar refraction. The table below contains the data obtained. Also contained in the table are the corresponding calculated values for the hydrolyzable chlorine content and molar refraction for gamma-cyanopropylethyldichlorosilane.

|  | Gamma-cyanopropylethyldichlorosilane | |
|---|---|---|
|  | Found | Calculated |
| Molar refraction | 47.79 | 48.09 |
| Hydrolyzable chlorine | 36.1 | 35.8 |

*Example 14*

To a 300 cc. stainless steel pressure vessel were added 0.75 mole (50.3 grams) of allyl cyanide, 0.75 mole (132.8 grams) of phenyldichlorosilane and 3.7 grams of platinum deposited on gamma alumina (containing 2 percent by weight of platinum). The vessel was sealed and heated to a temperature of 200° C. for a period of two hours. After heating the vessel was cooled to room temperature and the dark brown liquid product placed in a flask connected to a distillation column. The contents of the flask were heated to its boiling temperature under a reduced pressure and there was obtained 37.4 grams of gamma-cyanopropylphenyldichlorosilane boiling at a temperature of 145 to 148° C. under a reduced pressure of 2 mm. Hg. Gamma-cyanopropylphenyldichlorosilane has a refractive index $n_D^{25}$ of 1.5312 and a density $d_4^{25}$ of 1.19. The compound was also identified by infra-red analysis and by analysis for hydrolyzable chlorine (found 28.8 percent by weight, theory 29 percent by weight).

*Example 15*

Following the procedure disclosed in the previous example, 10 moles (670.9 grams) of allyl cyanide, 4.0 moles (404 grams) of dichlorosilane, 2.0 moles (270 grams) of trichlorosilane and 26.9 grams of platinum deposited on gamma alumina (containing 2 percent by weight of platinum) were heated in a stainless steel pressure vessel at a temperature of 100° C. for a period of six hours. The product was placed in a flask connected to a distillation column and heated to its boiling temperature. A fraction was obtained boiling at a temperature of from 34 to 115° C. at atmospheric pressure. The residue was distilled under reduced pressure and there was obtained 120.8 grams of gamma-cyanopropylhydrogendichlorosilane boiling at a temperature of 43 to 45° C. under a reduced pressure of 0.3 mm. Hg. Gamma-cyanopropylhydrogendichlorosilane has a refractive index $n_D^{25}$ of 1.4602 and a density $d_4^{25}$ of 1.21. The compound was identified by infra-red analysis as well as by analysis for hydrolyzable chlorine (found 42.9 percent by weight, theory 42.2 percent) reduced pressure of 2 mm. Hg. Gamma-cyanopropylphenyldichlorosilane has a refractive index $n_D^{25}$ of 1.5312 and a density $d_4^{25}$ of 1.19. The compound was also identified by infra-red analysis and by analysis for hydrolyzable chlorine (found 28.8 percent by weight, theory 29 percent by weight).

*Example 16*

Following the procedure disclosed in the previous example, 10 moles (670.9 grams) of allyl cyanide, 4.0 moles (404 grams) of dichlorosilane, 2.0 moles (270 grams) of trichlorosilane and 26.9 grams of platinum deposited on gamma alumina (containing 2 percent by weight of platinum) were heated in a stainless steel pressure vessel at a temperature of 100° C. for a period of six hours. The product was placed in a flask connected to a distillation column and heated to its boiling temperature. A fraction was obtained boiling at a temperature of from 34 to 115° C. at atmospheric pressure. The residue was distilled under reduced pressure and there was obtained 120.8 grams of gamma-cyanopropylhydrogendichlorosilane boiling at a temperature of 43 to 45° C. under a reduced pressure of 0.3 mm. Hg. Gamma-cyanopropylhydrogendichlorosilane has a refractive index $n_D^{25}$ of 1.4602, and a density $d_4^{25}$ of 1.21. The compound was identified by infra-red analysis as well as by analysis for hydrolyzable chlorine (found 42.9 percent by weight, theory 42.2 percent by weight), and by its molar refraction (found 38.65, calculated 38.75). The presence of a hydrogen to silicon bond in the compound was shown by the evolution of hydrogen when gamma-cyanopropylhydrogendichlorosilane was reacted with alcoholic potassium hydroxide.

*Example 17*

An equal molar mixture of allyl cyanide (64 grams) and trichlorosilane (121.9 grams) was added together with 3.6 grams of platinum deposited on gamma alumina (containing 2 percent by weight of platinum) to a 300 cc. stainless steel pressure vessel. The vessel was sealed and heated to a temperature of 200° C. for a period of two hours. After heating the vessel was cooled to room temperature and the product obtained removed therefrom and placed in a flask connected to a distillation column. The contents of the flask were heated to its boiling temperature and there was obtained 152.5 grams of gamma-cyanopropyltrichlorosilane boiling at a temperature of 72 to 75° C. under a reduced pressure of 1.1. mm. Hg. Gamma-cyanopropyltrichlorosilane was identified by infra-red analysis as well as by analysis for its hydrolyzable chlorine content (found 52.0 percent by weight, theory 52.5 percent by weight). Gamma-cyanopropyltrichlorosilane is a water white liquid which has a refractive index $n_D^{25}$ of 1.4638 and a density $d_4^{25}$ of 1.28.

*Example 18*

To a 300 cc. stainless steel pressure vessel was charged 0.9 mole (73 grams) of methallyl cyanide, 0.9 mole (121.3 grams) of trichlorosilane and 2 percent by weight of the reactants of platinum deposited on the gamma alumina (containing 2 percent by weight of platinum). The vessel was sealed and heated to a temperature of 200° C. for a period of two hours. After heating the vessel was cooled to room temperature, the product removed therefrom and placed in a flask connected to a distillation column. The contents of the flask were heated to its boiling temperature under a reduced pressure and there was obtained 9.1 grams of beta-methyl-gamma-cyanopropyltrichlorosilane boiling at a temperature of 43 to 50° C. under a reduced pressure of 0.5 mm. Hg. Beta-methyl-gamma-cyanopropyltrichlorosilane has a reflective index $n_D^{25}$ of 1.4690. The compound was also analyzed for hydrolyzable chlorine content (found 49.0 percent by weight, theory 49.2 percent by weight).

*Example 19*

To a 300 cc. stainless steel pressure vessel was added 0.52 mole (35 grams) of allyl cyanide, 0.36 mole (60 grams) of gamma-cyanopropylhydrogendichlorosilane and 2.25 grams of platinum deposited on gamma alumina (containing 2 percent by weight of platinum). The vessel was sealed and heated to a temperature of 150° C. for a period of seventeen hours. After heating the vessel was cooled to room temperature and 93.2 grams of product removed therefrom and charged to a flask connected to a fractionating column. The contents of the flask were heated to its boiling temperature and 45.4 grams of bis-(gamma-cyanopropyl)dichlorosilane were distilled at a temperature 173–177° C. under a reduced pressure of 1.0–1.4 mm. Hg. Bis(gamma-cyanopropyl)dichlorosilane was identified by infra-red analysis as well as by analysis for its hydrolyzable chlorine content (found 30.05 percent by weight, theory 30.12 percent by weight) and its molar refraction (found 56.94, calculated 57.08). The compound has a refractive index $n_D^{25}$ of 1.4799.

*Example 20*

To a 50 cc. steel pressure vessel were added 0.15 mole (20.3 grams) of trichlorosilane, 0.15 mole (8 grams) of acrylonitrile and 0.56 gram (2 percent by weight) of triphenylphosphine. The vessel was sealed and heated, while being rocked, to a temperature of 200° C. for a period of two hours. After heating, the vessel was cooled to room temperature, the product removed therefrom and placed in a flask connected to a distillation column. The contents of the flask were heated to its boiling temperature under reduced pressure and there was obtained 15.85 grams of beta-cyanoethyltrichlorosilane boiling at a temperature of 75 to 85° C. under a reduced pressure of 5 to 7 mm. Hg. Beta-cyanoethyltrichlorosilane was identified by infra-red analysis and by analysis for hydrolyzable chlorine (obtained 56.0 percent by weight, theory 56.4 percent by weight). Alpha-cyanoethyltrichlorosilane was not produced by the reaction. The 15.85 grams of beta-cyanoethyltrichlorosilane represented a yield of 56.0 percent based on the total number of moles of the starting materials.

*Example 21*

To a 500 ml. flask equipped with a condenser, a mechanical stirrer, and dropping funnel was added a solution comprising 0.20 mole (36.4 grams) of beta-cyanoethyltrichlorosilane dissolved in 75 ml. of anhydrous ethyl ether. While stirring the mixture, 0.58 mole (26.7 grams) of ethanol was slowly added by means of the dropping funnel. After the addition, the mixture was continually stirred for about three hours after which time it was heated to its boiling temeprature under reduced pressure. There was obtained 24.2 grams of beta-cyanoethyltriethoxysilane boiling at 102° C. under a reduced pressure of 3.8 mm. Hg. Beta-cyanoethyltriethoxysilane has a density $d_4^{25}$ of 0.970 and a refractive index $n_D^{25}$ of 1.4153. Elemental analyses for carbon, hydrogen, silicon, nitrogen and ethoxy content were also conducted with the values obtained listed in the table below where they are compared with the corresponding calculated values for beta-cyanoethyltriethoxysilane:

|  | Beta-cyanoethyltriethoxysilane | |
|---|---|---|
|  | Found | Calculated |
| Carbon, percent by weight | 49.5 | 49.74 |
| Hydrogen, percent by weight | 8.7 | 8.81 |
| Silicon, percent by weight | 11.8 | 12.91 |
| Nitrogen, percent by weight | 6.1 | 6.45 |
| Ethoxy, percent by weight | 62.4 | 62.21 |

*Example 22*

To a 300 cc. steel pressure vessel were added 0.58 mole (39 grams) of methacrylonitrile, 0.58 mole (78 grams) of trichlorosilane and 2 percent by weight of the reactants of triphenylphosphine. The vessel was sealed and heated to a temperature of 150° C. for a period of two hours. The product obtained, which was light green in color, was placed in a 250 ml. distilling flask and fractionally distilled under a reduced pressure through a Vigreux column. There was obtained 41.4 grams of beta-cyanopropyltrichlorosilane boiling at a temperatupre of 74 to 77° C. under a reduced pressure of 3 mm. Hg. Beta-cyanopropyltrichlorosilane has a refractive index $n_D^{25}$ of 1.4583 and a density $d_4^{25}$ of 1.28. Beta-cyanoethyltrichlorosilane was identified by infra-red analysis as well as by analysis for hydrolyzable chlorine (obtained 51.8 percent by weight, theory 52.5 percent by weight).

*Example 23*

To a 300 cc. steel pressure vessel were added 0.78 mole (89.7 grams) of methyldichlorosilane, 0.78 mole (41.5 grams) of acrylonitrile and 2 percent by weight of the reactants of triphenylphosphine. The vessel was sealed and heated, while being rocked, to a temperature of 150° C. for a period of two hours. After heating the vessel was cooled to room temperature, the product removed therefrom and placed in a flask connected to a distillation column. The contents of the flask were heated to its boiling temperature under reduced pressure and there was obtained 11.6 grams of beta-cyanoethylmethyldichlorosilane boiling at a temperature of 45 to 55° C. under a reduced pressure of 2 mm. Hg. Beta-cyanoethylmethyldichlorosilane was identified by infra-red analysis.

*Example 24*

Following the procedure set forth in Example 23, 0.46 mole (59 grams) of methyldiethoxysilane, 0.46 mole (25 grams) of acrylonitrile, and 2 percent by weight of the reactants of triphenylphosphine were heated in a pressure vessel at a temperature of 200° C. for a period of five hours. The product was placed in a flask connected to a fractionating column and heated to its boiling temperature under a reduced pressure. There was obtained 1 gram of beta-cyanoethylmethyldiethoxysilane which was clear yellow in color.

*Example 25*

Ethyldichlorosilane [0.9 mole (116.1 grams)], 0.9 mole (48 grams) of acrylonitrile and 2 percent by weight of the reactants of triphenylphosphine were heated in a pressure vessel at a temperature of 150° C. for a period of two hours. The product obtained was placed in a flask connected to a fractionating column and heated to its boiling temperature under reduced pressure. There was obtained 23.2 grams of beta-cyanoethylethyldichlorosilane boiling at a temperature of 50 to 60° C. under a reduced pressure of 1 mm. Hg. Beta-cyanoethylethyldichlorosilane was also identified by infra-red analysis.

*Example 26*

To a 300 cc. steel pressure vessel were added 0.3 mole (53.6 grams) of phenyldichlorosilane and 0.3 mole (16 grams) of acrylonitrile and 2 percent by weight of the reactants of triethylamine. The vessel was sealed and heated, while being rocked, at a temperature of 150° C. for a period of five hours. The product obtained, which was a dark brown liquid, was fractionally distilled under reduced pressure. There was obtained 15.7 grams of beta-cyanoethylphenyldichlorosilane boiling at a temperature of 96° C. under a reduced pressure of 2 mm. Hg. Beta-cyanoethylphenyldichlorosilane was identified by infra-red analysis and by analysis for hydrolyzable chlorine (obtained 30.2 percent by weight, theory 30.8 percent by weight).

*Example 27*

To a 300 cc. steel pressure vessel were added 0.75 mole (40 grams) of acrylonitrile, 0.19 mole (26 grams) of trichlorosilane, 0.75 mole (76 grams) of dichlorosilane and 2 percent by weight of the reactants of triphenylphosphine. The vessel was sealed and heated, while being rocked, to a temperature of 100° C. for a period of two hours. The product obtained was placed in a flask connected to a distillation column and heated to its boiling temperature under a reduced pressure. There was obtained 14.4 grams of beta-cyanoethyldichlorosilane boiling at a temperature of 50 to 52° C. under a reduced pressure of 2 mm. Hg. Beta-cyanoethyldichlorosilane was identified by infra-red analysis and by analysis for hydrolyzable chlorine (obtained 47.9 percent by weight, theory 46.0 percent by weight). The presence of a silicon to hydrogen bond in beta-cyanoethyldichlorosilane was also proven by the evolution of hydrogen when the compound was added to an alcoholic caustic solution.

*Example 28*

Following the procedure disclosed in Example 20, 0.15 mole (20.3 grams) of trichlorosilane, 0.15 mole (8 grams) of acrylonitrile and 2 percent by weight of tri-n-butylphosphine were heated in a rocking pressure vessel to a temperature of 200° C. for a period of two hours. After heating, the vessel was cooled to room temperature, the product removed therefrom and placed in a flask connected to a distillation column. The contents of the flask were heated to its boiling temperature under reduced pressure and there was obtained 15.83 grams of beta-cyanoethyltrichlorosilane boiling at a temperature of 75 to 85° C. under a reduced pressure of 5 to 7 mm. Hg.

*Example 29*

To a 50 cc. steel pressure vessel were added 0.15 mole (20.3 grams) of trichlorosilane, 0.15 mole (8 grams) of acrylonitrile and 0.56 gram (2 percent by weight) of triethylamine. The vessel was sealed and heated, while being rocked, to a temperature of 200° C. for a period of two hours. After heating, the vessel was cooled to room temperature, the product removed therefrom and placed in a flask connected to a distillation column. The contents of the flask were heated to its boiling temperature under reduced pressure and there was obtained 7.74 grams of beta-cyanoethyltrichlorosilane boiling at a temperature of 75 to 85° C. under a reduced pressure of 5 to 7 mm. Hg.

*Example 30*

To a 50 cc. steel pressure vessel were added 0.15 mole (20.3 grams) of trichlorosilane, 0.15 mole (8 grams) of acrylonitrile and 0.56 gram (2 percent by weight) of triphenylarsine. The vessel was sealed and heated, while being rocked, to a temperature of 200° C. for a period of two hours. After heating, the vessel was cooled to room temperature, the product removed therefrom and placed in a flask connected to a distillation column. The contents of the flask were heated to its boiling temperature under reduced pressure and there was obtained 7.31 grams of beta-cyanoethyltrichlorosilane boiling at a temperature of 75 to 85° C. under a reduced pressure of 5 to 7 mm. Hg.

*Example 31*

To a 300 cc. stainless steel pressure vessel was charged 0.9 mole (60.4 grams) of allyl cyanide, 0.9 mole (121.9 grams) of trichlorosilane and 2 percent by weight of the reactants of triphenylphosphine. The vessel was sealed and heated, while being rocked, to a temperature of 150° C. for a period of two hours. After heating the vessel was cooled to room temperature, the product removed therefrom and placed in a flask connected to a distillation column. The contents of the flask were heated to its boiling temperature under reduced pressure and there was obtained 56.89 grams of gamma-cyanopropyltrichlorosilane boiling at a temperature of 55–65° C. under a reduced pressure of .5 to .7 mm. Hg.

*Example 32*

To a one liter flask equipped with stirrer and reflux condenser were charged 100 cc. of a 3 percent water solution of sodium hydroxide and 187 grams (1 mole) of beta-cyanoethylmethyldiethoxysilane dissolved in 400 cc. of diethyl ether. The mixture was stirred for a period of about 4 hours after which time it was heated under reduced pressure to distill the ether and the ethyl alcohol formed during the hydrolysis reaction. The product was washed with water until neutral and then dried over anhydrous sodium sulphate. The product was then added to a flask and heated under reduced pressure to distill any residual ether or alcohol content therein. There was obtained 68 grams of a colorless oil. The oil was then placed in a flask connected to a Vigreux column and heated to its boiling temperature. There was distilled 49 grams of the cyclic tetramer of betal-cyanoethylmethylsiloxane which was identified by elemental analysis as well as by infra-red analysis. Infra-red analysis of the product remaining in the flask resulted in the identification of the cyclic pentamer, hexamer and heptamer, of beta-cyanoethylmethylsiloxane.

The cyclic tetramer of beta-cyanoethylmethylsiloxane has a boiling temperature of 277 to 280° C. under a reduced pressure of 0.2 mm. Hg and a refractive index $n_D^{25}$ of 1.4580. The values appearing below were obtained from the elemental analysis of the compound and are compared with the corresponding calculated values.

|  | Cyclic Tetramer of Beta-cyanoethyl-methylsiloxane | |
| --- | --- | --- |
|  | Found | Calculated |
| Carbon, percent by weight | 42.6 | 42.3 |
| Hydrogen, percent by weight | 6.0 | 6.14 |
| Silicon, percent by weight | 23.9 | 24.5 |
| Nitrogen, percent by weight | 12.1 | 12.3 |
| Molecular weight | 474 | 456 |

*Example 33*

To a beaker containing 400 cc. of cracked ice and 100 cc. of diethyl ether was added, while stirring the mixture, 15.46 grams of beta-cyanoethyltrichlorosilane dissolved in 10 cc. of diethyl ether. During the addition of the solution of beta-cyanoethyltrichlorosilane hydrogen chloride was evolved. After the addition, the beaker was allowed to stand overnight during which time the diethyl ether evaporated and a thick syrup formed on the bottom of the beaker. The syrup was removed from the beaker, washed with distilled water until neutral and then desolvated under reduced pressure at a temperature of 25° C. for a period of 160 hours. There was obtained 8.08 grams of beta-cyanoethylpolysiloxane $$[(NCCH_2CH_2SiO_{3/2})]$$

Beta-cyanoethylpolysiloxane was identified by infra-red analysis and by elemental content. The table below contains the values obtained from our analysis as well as the corresponding calculated values.

|  | [NCCH$_2$CH$_2$SiO$_{3/2}$] | |
| --- | --- | --- |
|  | Found | Calculated |
| Carbon, percent by weight | 29.7 | 33.9 |
| Hydrogen, percent by weight | 3.9 | 3.8 |
| Silicon, percent by weight | 25.0 | 26.4 |
| Nitrogen, percent by weight | 12.4 | 13.2 |

*Example 34*

A sample of the beta-cyanoethylpolysiloxane prepared in the previous example was placed in a weighing bottle and the bottle placed in a forced draft air oven maintained at a temperature of 250° C. for a period of 96 hours. The weighing bottle was then removed from the oven and the polymer analyzed to determine the extent of decomposition caused by the elevated temperature. A variation in the elemental content of the polymer before and after heating is an indication of the extent of decomposition. In the sample tested, the beta-cyanoethylpolysiloxane had a carbon content of 29.7 percent by weight before heating and a carbon content of 26.3 percent by weight after heating. Such values indicate that beta-cyanoethylpolysiloxane retains 88.3 percent of its carbon content at elevated temperatures, which makes the polymers desirable as a protective coating.

This application is a continuation-in-part application of applications Serial Nos. 555,201, 555,202, now abandoned, and 555,203, now abandoned, all of which were filed on December 23, 1955.

What is claimed is:

1. A process for reacting a silane, represented by the formula:

$$\begin{array}{c} R_{(n)} \\ | \\ H-Si-X_{(3-n)} \end{array}$$

where R represents a member of the group consisting of hydrogen and a hydrocarbyl group, X represents a hydrolyzable group from the class consisting of halogen and hydrocarbyloxy groups and $n$ represents a whole number having a value of from 0 to 2, with an acyclic aliphatic mono-olefinic nitrile composed of carbon, hydrogen and nitrilo nitrogen having an aliphatic unsaturated grouping $$(-\overset{|}{C}=\overset{|}{C}-)$$

which is at least one carbon atom removed from the cyano group thereof to produce a cyanoalkylsilane by the addition of a silyl group to the olefinic carbon atom of said mono-olefinic nitrile further removed from the cyano group thereof and by the addition of a hydrogen atom to the olefinic carbon atom of said mono-olefinic nitrile closer to the cyano group thereof which comprises forming a mixture of said silane, said mono-olefinic nitrile, and a platinum metal, heating said mixture to a temperature sufficiently elevated to cause said silane and nitrile to react to produce a cyanoalkylsilane by the addition of a silyl group to the olefinic carbon atom further removed from the cyano group of the starting nitrile and by the addition of a hydrogen atom to the olefinic carbon atom closer to the cyano group of the starting nitrile.

2. A process for reacting a silane, represented by the formula:

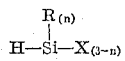

where R represents a member of the group consisting of hydrogen and a hydrocarbyl group, X represents a hydrolyzable group from the class consisting of halogen and hydrocarbyloxy groups and $n$ represents a whole number having a value of from 0 to 2, with allyl cyanide to produce a gamma-cyanopropylsilane which comprises forming a mixture of said silane, said allyl cyanide and a platinum metal, heating said mixture to a temperature sufficiently elevated to cause said silane and said allyl cyanide to react to produce a gamma-cyanopropylsilane.

3. A process for reacting a silane, represented by the formula:

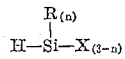

where R represents a member of the group consisting of hydrogen and a hydrocarbyl group, X represents a hydrolyzable group from the class consisting of halogen and hydrocarbyloxy groups and $n$ represents a whole number having a value of from 0 to 2, with allyl cyanide to produce a gamma-cyanopropylsilane which comprises forming a mixture of said silane, said allyl cyanide and platinum deposited on gamma alumina, heating said mixture to a temperature sufficiently elevated to cause said silane and said allyl cyanide to react to produce a gamma-cyanopropylsilane.

References Cited in the file of this patent

UNITED STATES PATENTS

| | | |
|---|---|---|
| 2,486,162 | Hyde | Oct. 25, 1949 |
| 2,721,873 | MacKenzie et al. | Oct. 25, 1955 |
| 2,776,306 | Cole | Jan. 1, 1957 |
| 2,823,218 | Speier et al. | Feb. 11, 1958 |
| 2,851,473 | Wagner et al. | Sept. 9, 1958 |
| 2,855,381 | Sommer | Oct. 7, 1958 |
| 2,901,460 | Boldebuck | Aug. 25, 1959 |
| 2,906,767 | Sommer | Sept. 29, 1959 |
| 3,026,278 | Walton et al. | Mar. 20, 1962 |
| 3,099,670 | Prober | July 30, 1963 |

FOREIGN PATENTS

| | | |
|---|---|---|
| 1,116,725 | France | Feb. 6, 1956 |
| 1,116,726 | France | Feb. 6, 1956 |
| 1,154,331 | France | Oct. 28, 1957 |

OTHER REFERENCES

Petrov et al.: "Doklady Akad. Nauk, USSR," vol. 100 (Feb. 1955), pp. 711–4.

McGregor: "Silicones and Their Uses," McGraw-Hill Book Co., Inc., New York, publ. (1954), pp. 265–79.